United States Patent [19]

Schaefer

[11] Patent Number: 4,482,220

[45] Date of Patent: Nov. 13, 1984

[54] DEVICE FOR CORRECTIVELY COMPENSATING THE APERTURE ERROR IN REPRODUCING SYSTEMS

[75] Inventor: Klaus D. Schaefer, Braunfels, Fed. Rep. of Germany

[73] Assignee: Ernst Leitz Wetzlar GmbH, Wetzlar, Fed. Rep. of Germany

[21] Appl. No.: 290,934

[22] Filed: Aug. 7, 1981

[30] Foreign Application Priority Data

Aug. 9, 1980 [DE] Fed. Rep. of Germany ....... 3030205

[51] Int. Cl.$^3$ .............................. G02B 9/00; G03B 3/00
[52] U.S. Cl. .................................. 350/450; 354/195.1
[58] Field of Search ............... 350/429, 450, 423, 426, 350/427; 354/196; 352/140; 354/195.1

[56] References Cited

U.S. PATENT DOCUMENTS

| | | | |
|---|---|---|---|
| 3,918,797 | 11/1975 | Takano | 350/450 X |
| 3,918,798 | 11/1975 | Takano | 350/450 X |
| 4,064,520 | 12/1977 | Freudenschuss et al. | 352/140 X |
| 4,154,517 | 5/1979 | Tamura et al. | 354/196 X |
| 4,159,864 | 7/1979 | Yasukuni et al. | 354/196 X |
| 4,168,116 | 9/1979 | Goldberg | 354/195.1 X |
| 4,299,453 | 11/1981 | Momiyama et al. | 350/450 X |
| 4,367,927 | 1/1983 | Fujii | 350/426 |

OTHER PUBLICATIONS

Goldberg, N.; "What ISFO Is and How It Works"; *Popular Photography;* vol. 84, No. 4; Apr. 1979, pp. 88, 89, 232 & 234.

Primary Examiner—John K. Corbin
Assistant Examiner—Scott J. Sugarman
Attorney, Agent, or Firm—Wells & Wells

[57] ABSTRACT

Device for the corrective compensation of the altering aperture error formed by varying the aperture stop in reproducing systems of image recording apparatus, for instance photographic cameras.

The reproducing system (2,3,4) comprises at least one optical member (3,22) affecting the aperture error and displaceably supported along the optical axis (23) of the reproducing system (2,3,4) for varying its relative position with respect to the other components (2,4) of the reproducing system. Setting means (17,28) are further provided which as a function of the variation in the aperture stop displace the optical member (3,22) by an extent corresponding to a corrective compensating nominal value along the optical axis (23) of the reproducing system (2,3,4).

12 Claims, 4 Drawing Figures

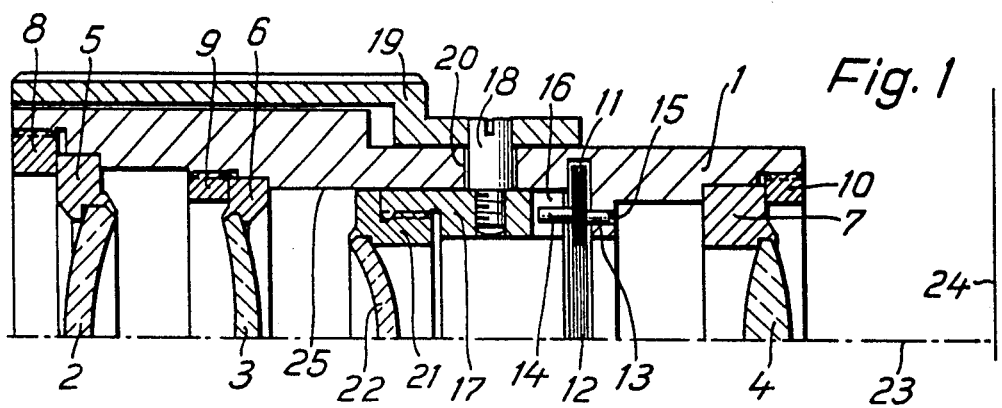
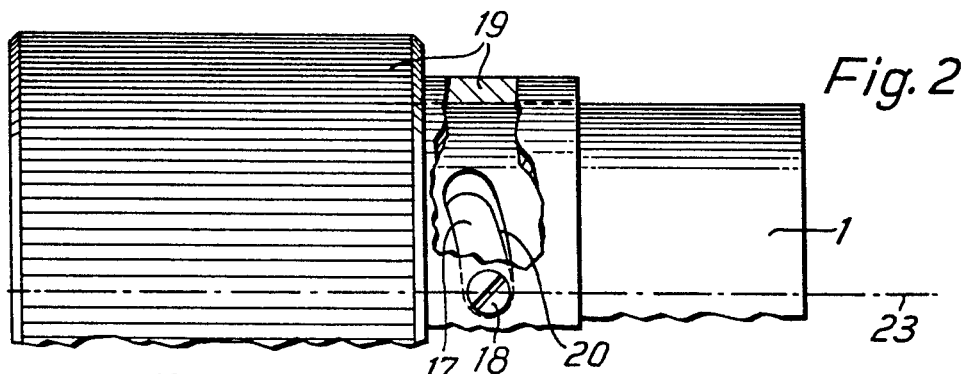
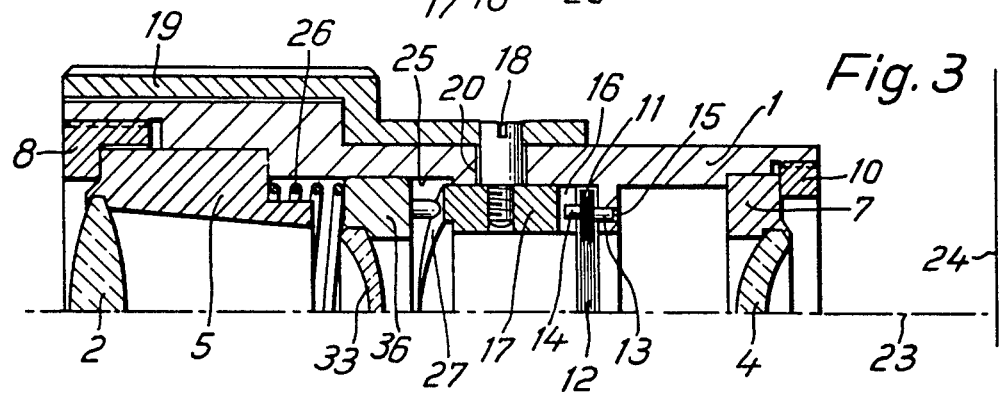
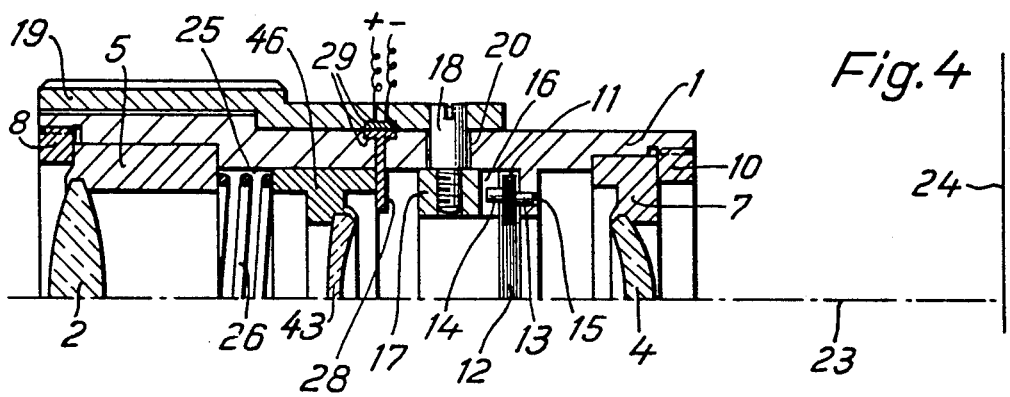

DEVICE FOR CORRECTIVELY COMPENSATING THE APERTURE ERROR IN REPRODUCING SYSTEMS

BACKGROUND OF THE INVENTION

The present invention concerns correctively compensating changing aperture errors generated by aperture stop variations in reproducing systems of image recording apparatus, for example, photographic cameras.

Such a compensating device is necessary to minimize, and under some circumstances even completely compensate for the drifting of the plane of the "best" focus along the optical axis when the effective aperture of the reproducing system (focal shift) is reduced. The minimization or the complete elimination of this effect is especially desired in single lens reflex cameras which use so-called grid screens in lieu of a genuine matte screen as the focusing criterion and possibly use means for additional focus such as the so-called "measuring wedges". As these grid screens and measuring wedges lead to a splitting of the pupils of the reproducing systems, they must be constructed so that when more light absorbing image systems are used no adverse effect on the viewer image is caused by obscuring of the wedge surface of the grid screens or "measuring wedges". Necessitating therefrom, the reproducing systems must be focused at effective stops of about f/4 . . . f/5.6, whereas the exposure is possibly executed at stops of f/2 or f/1.4. As a result there is a difference of the order of 1/10 mm between the planes of sharpest focus for the two apertures, namely the aperture when focusing and the aperture when exposing. In other words, as a matter of fact, the focusing is erroneous.

To compensate for this effect, it has been proposed in the magazine Popular Photography, Vol. 84, No. 4 April 1979 by Norman Goldberg, "What is ISFO and how it WORKS" to provide an objective controlled displacement between the focusing and the film planes in the camera.

Besides it has also been proposed to move the film plane itself at the time of exposure.

Both solutions suffer from the drawback that complex means for control are required both in the objective as well as in the camera and that integration of these controls into existing camera systems can only be achieved at considerable cost.

It is further known to remedy the undesired effect of the focal shift by shifting the plane of the measuring wedges by a predetermined amount with respect to the film plane. This solution, however, is only satisfactory when the deviation between the best focusing plane and the film plane is approximately constant for the medium f/apertures in all reproducing systems. In fact, however, this deviation increases as the relative aperture increases.

SUMMARY OF THE INVENTION

Having in mind the limitations of the prior art it is an object of the present invention to construct a device unrelated to mechanical changes in the camera housing but exclusively pertained to the reproducing systems for eliminating the effects of the altering aperture aberration (spherical aberration) in reproducing systems resulting from varying the aperture stop and for setting the focusing difference at a uniform value for all objectives in the normal condition, i.e., while viewing, whereby this value shall depend on the fastest objective of a series of objectives.

This object is achieved according to the present invention in a device for correctively compensating the altering aperture error in reproducing systems of image recording apparatus formed when the aperture stop is varied by having a reproducing system which comprises at least one optical member affecting the aperture error and displaceably mounting the optical member along the optical axis of the reproducing system for varying its position in relation to the other components of the system, and providing adjusting means which shift the optical member as a function of the variation in the aperture stop along the optical axis of the reproducing system by an extent corresponding to the corrective compensating nominal value.

BRIEF DESCRIPTION OF THE DRAWINGS

The drawings schematically show illustrative embodiments of the present invention, which are described more comprehensively below.

FIG. 1 is a correction member connected in form-closed manner with the stud guide-ring of the stop of the reproducing system;

FIG. 2 is the control of the corrective member of FIG. 1;

FIG. 3 is the control of the corrective member by means of a force-locking connction with the stop setting ring of the reproducing system; and FIG. 4 is a control of the corrective member by means of an electromechanical element.

DESCRIPTION OF THE PREFERRED EMBODIMENTS

With particular reference to FIG. 1, a housing 1 is shown containing a reproducing system consisting of the optical components 2, 3 and 4. The components 2, 3 and 4 are held in mounts 5, 6 and 7 of which the outside diameters are fitted into the housing 1. The mounts 5, 6 and 7 rest by their front sides against corresponding support surfaces in the housing 1 and are kept in position by the securing rings 8, 9 and 10.

An iris diaphragm 11 is mounted between the components 3 and 4 of the reproducing system. This diaphragm consists of a plurality of laminations 12 which are provided with a pivot stud 13 and a guide pin 14. The pivot studs 13 are seated solidly in pivot bearings 15 arranged in the housing 1. The guide pins 14 slide in a slot 16 of a stud guide ring 17 rotatably supported in housing 1 and which implements the opening or the closing of the iris diaphragm 11. Lastly, a drive screw 18 connects the stud guide ring 17 with a setting ring 19 rotatably mounted outside the housing on its surface. This screw 18 by means of its shank, passes through a slot 20 of corresponding length (FIG. 2) fashioned at a corresponding location in the housing 1, this length corresponding to that motion which is required to open or close the iris diaphragm 11 to its largest diameter or least diameter, respectively.

A mount 21 is screwed into the opening of the stud guide ring 17 which is away from the laminations 12 of the iris diaphragm 11, and this mount 21 holds a corrective lens 22 possibly made of plastic. This lens 22 is displaceable along the optical axis 23 of the reproducing system (lenses 2–4) to compensate for the aperture error. This displacement is generated by the fact that the slot 20 is constructed as a cam corresponding to the difference between the settings of the planes of optimal focus and of the image plane 24 of an image recording apparatus (omitted), whereby the rotation of the stud guide ring 17 causes the displacement of the corrective lens 22 along the optical axis 23 (FIG. 2).

As regards the embodiment shown in FIG. 3, the compensation of the aperture error is assumed by a component of the reproducing system, namely the optical number 33 itself. To that end, the mount 36 of the member 33 is supported in a cylindrical recess 25 of the housing 1 along the optical axis 23 in a displaceable manner against the force of spring 26. The extent of the displacement of the mount 36 is controlled by a cam 27 mounted to the side of the stud guide ring 17 which is away from the iris diaphragm and against which the mount 36 is positively pressed by the force from the spring 26. The cam 27 is constructed to correspond to the particular value regarding the compensation of the difference between the setting plane of maximum focus and the image plane 24 of the image recording apparatus, so that upon a rotational setting of the stud guide ring 17, the mount 36 is axially displaced together with the lens 33.

Another embodiment of the present invention is shown in FIG. 4. In this embodiment, the corrective compensation is implemented electromechanically. The same as in FIG. 3, the compensation of the aperture errors is implemented by the optical member 43 held in the mount 46, where the member 43 represents the reproducing system. As described in relation to FIG. 3, the mount 36 is supported in axially displaceable manner in a cylindrical recess 25 of housing 1. In this case, however, the mount 46 rests by its reverse side on piezoelectric bars 28 which by means of contact means 29 are connected to a voltage regulator (omitted) and a voltage source (also not shown). The voltage regulator for instance may be a rheostat, of which the wiper is adjusted synchronously with the rotation of the setting ring 19 and which rheostat ensures a voltage supply to the piezoelectric bars 28 corresponding to the required axial displacement.

Even though the illustrative embodiments show only reproducing systems of which the stop settings are introduced manually, the scope of the invention also covers balancing the aperture errors of such a system using an automatic aperture control or a motorized control.

Obviously, it is equally conceivable to combine the already known displacements of rangefinding with the invention's displacements of optical members. Again, the application of such a "corrective compensation lens" coupled to the aperture settings is not restricted solely to fixed-focus reproducing systems. Rather it applies to all reproducing systems suffering from a focal shift wherein a shift of the "best focus plane" results from a change in the aperture stop. This also applies to variable focus systems for which often an optimal correction of the aperture error cannot be achieved when a somewhat uniform image quality is desired at all focal lengths.

I claim:

1. A device for the corrective compensation of an altering aperture error formed by variation of an aperture stop in a reproducing system having an optical axis of image recording apparatus, comprising:
said reproducing system (2, 3, 4) comprising one optical member (22, 33, 43) affecting said aperture error and displaceably supported along said optical axis (23), said reproducing system having at least two fixed optical components (2, 3, 4) and said aperture stop, said displacement varying said optical member's relative position with respect to said fixed optical components (2, 4) and setting means (17, 28) displacing said optical member (22, 33, 43) by an extent corresponding to a corrective compensating nominal value along said optical axis (23) of said reproducing system (2, 3, 4) as a function of the variation in said aperture stop.

2. The device of claim 1, wherein there are two fixed optical components.

3. The device of claim 1, wherein there are three fixed optical components.

4. The device of claim 1, wherein said setting means is operatively coupled to a movable support component (21, 36, 46) for receiving said optical member (22, 33, 43) of the reproducing system and said support component is displaceable along said optical axis (23) against a return force of a spring (26) for the purpose of controlling said aperture error when said aperture stop is varied.

5. The device of claim 1, wherein said setting means is operatively coupled to a movable support component (21) for receiving said optical member (22) and said support component is displaceable along said optical axis (23) against return force means for the purpose of controlling said aperture error when said aperture stop is varied.

6. The device of claim 1, wherein said setting means are mechanically activated.

7. The device of claim 1, wherein said setting means are electrochemically activated.

8. The device of claim 1, wherein said aperture stop is defined by an iris diaphragm (11) with a plurality of movable components (12) coupled to said setting means.

9. The device of claim 1, wherein said image recording apparatus is a photographic camera.

10. The device of claim 1, wherein said image recording apparatus is a single lens reflex camera.

11. The device of clalim 10, wherein said single lens reflex camera has a grid screen and measuring wedges which produce a splitting of pupils of said reproducing system.

12. The device of claim 11, wherein there is a difference of about 1/10 mm between the plane of sharpest focus for the aperture when focusing and the aperture when exposing.

* * * * *